(12) United States Patent
Wu et al.

(10) Patent No.: US 11,858,018 B1
(45) Date of Patent: Jan. 2, 2024

(54) IN-SITU REMEDIATION METHOD FOR LEAD-ZINC SLAG DUMP

(71) Applicant: GUIZHOU UNIVERSITY, Guiyang (CN)

(72) Inventors: Pan Wu, Guiyang (CN); Han Tu, Guiyang (CN); Shui Zhang, Guiyang (CN); Youfa Luo, Guiyang (CN); Manzhi Chen, Guiyang (CN)

(73) Assignee: GUIZHOU UNIVERSITY, Guiyang (CN)

( * ) Notice: Subject to any disclaimer, the term of this patent is extended or adjusted under 35 U.S.C. 154(b) by 0 days.

(21) Appl. No.: 18/322,000

(22) Filed: May 23, 2023

(30) Foreign Application Priority Data

Jun. 14, 2022 (CN) .......................... 202210673856.X

(51) Int. Cl.
*A01G 25/06* (2006.01)
*B09C 1/10* (2006.01)
*A01G 25/00* (2006.01)

(52) U.S. Cl.
CPC .............. *B09C 1/10* (2013.01); *A01G 25/00* (2013.01); *A01G 25/06* (2013.01); *B09C 2101/00* (2013.01)

(58) Field of Classification Search
CPC .... A01G 25/00; A01G 25/023; A01G 25/026; B09C 1/10; B09C 2101/00
See application file for complete search history.

(56) References Cited

U.S. PATENT DOCUMENTS

| | | | | | |
|---|---|---|---|---|---|
| 3,309,875 | A | * | 3/1967 | Niederwemmer | E02B 13/00 405/38 |
| 2008/0098652 | A1 | * | 5/2008 | Weinbel | A01G 25/06 47/1.01 F |
| 2010/0299994 | A1 | * | 12/2010 | Kneussle | E02F 5/08 47/58.1 SC |
| 2021/0029901 | A1 | * | 2/2021 | Iorio | A01G 25/06 |

FOREIGN PATENT DOCUMENTS

| | | |
|---|---|---|
| CN | 102652480 A | 9/2012 |
| CN | 104164883 A | 11/2014 |
| CN | 205071813 U | 3/2016 |
| CN | 108360516 A | 8/2018 |
| CN | 108797615 A | 11/2018 |
| CN | 109304352 A | 2/2019 |
| CN | 109601336 A | 4/2019 |
| CN | 109763504 A | 5/2019 |
| CN | 110089353 A | 8/2019 |
| CN | 112642856 A | 4/2021 |
| CN | 214263222 U | 9/2021 |

* cited by examiner

*Primary Examiner* — Tuongminh N Pham
(74) *Attorney, Agent, or Firm* — Kaplan Breyer Schwarz, LLP; Stuart H. Mayerr

(57) ABSTRACT

An in-situ remediation method for a lead-zinc slag dump is provided, belonging to the technical field of prevention and control of soil pollution, including: step 1, providing a curing agent layer, a clay barrier layer and a planting soil layer on a surface of the lead-zinc slag dump in sequence, and providing an interceptor ditch and a retaining wall at a highest position and a lowest position of the lead-zinc slag dump respectively; step 2, planting ground covers and/or shrubs in the planting soil layer; and step 3, providing baffle plates and a plurality of regulating assemblies in lead-zinc slag, wherein each of the regulating assemblies comprises a water tank, a blind ditch and a first isolation plate, and a water outlet end of the water tank and a water outlet end of the blind ditch are connected with a reservoir.

8 Claims, 7 Drawing Sheets

IN-SITU REMEDIATION METHOD FOR LEAD-ZINC SLAG DUMP

CROSS-REFERENCE TO RELATED APPLICATIONS

This application claims priority of Chinese Patent Application No. 202210673856.X, filed on Jun. 14, 2022, the entire contents of which are incorporated herein by reference.

TECHNICAL FIELD

The application belongs to the technical field of prevention and control of soil pollution, and in particular relates to an in-situ remediation method for a lead-zinc slag dump.

BACKGROUND

Lead-zinc slags contain Pb, Zn, Cu, Cr and other heavy metals. High-content heavy metals in the slag diffuse into the surrounding atmosphere, water, soil, crops and other environmental media through wind, leaching and surface runoff, which seriously threatens the water quality safety, food safety and regional ecological safety in the surrounding and downstream areas, eventually enter human body through the food chain or by direct absorbing and thereby causes serious damage to the human body.

In-situ remediation refers to the remediation in the original contaminated site, and is one of the main remediation methods of a lead-zinc slag dump. The remediation of the lead-zinc slag dump is mainly based on the in-situ remediation (comprehensive treatment), supplemented by loose slag collection, fixed by physical stability, sealing, isolation, chemical alkalization and other methods, and comprehensively treated by plant covering and corresponding engineering measures.

In the in-situ remediation of the lead-zinc slag dump (as shown in FIG. 1), lead-zinc slag is generally stacked on soil, a curing agent layer, a clay barrier layer and a planting soil layer are sequentially provided on a surface of the lead-zinc slag dump from bottom to top, and ground covers and/or shrubs are planted on the planting soil layer, and an interceptor ditch and a retaining wall are provided at a highest position and a lowest position of the lead-zinc slag dump respectively. By arranging the curing agent layer and the clay barrier layer, the amount of rainwater entering the lead-zinc slag is greatly reduced, which greatly reduces the migration of the heavy metals due to leaching; by planting the ground covers and the shrubs on the planting soil layer, the migration of the heavy metals caused by rainwater scouring on the surface is reduced. However, the current in-situ remediation method has the following problems: firstly, since rainfall mainly occurs in summer in Guizhou Province, although the current in-situ remediation method is provided with a curing agent layer, a clay barrier layer and a planting soil layer, in the case of heavy rain in summer, and a large amount of rainwater still infiltrates into the lead-zinc slag below, which makes the heavy metals in the lead-zinc slag enter the groundwater and soil below and thereby leads to an increase in heavy metal migration; secondly, due to arranging the curing agent layer and the clay barrier layer, contents of air and corresponding nutrients entering the lead-zinc slag are reduced, which seriously affects the survival of the microorganisms in the lead-zinc slag, results in a decrease in the number of the microorganisms in the lead-zinc slag and further greatly reduces the adsorption and digestion of the heavy metals such as lead and zinc by microorganisms; and thirdly, since the heavy metals in the lead-zinc slag have great toxic and side effects on plants, it is not conducive to the normal growth of plants, when the roots of the ground covers and the shrubs extend into the lead-zinc slag.

SUMMARY

An objective of the present application is to provide an in-situ remediation method for a lead-zinc slag dump, so as to improve a survival rate of microorganisms in lead-zinc slag and reduce contents of heavy metals leaching into soil.

The application provides an in-situ remediation method for a lead-zinc slag dump, including:

step 1, providing a curing agent layer, a clay barrier layer and a planting soil layer on a surface of the lead-zinc slag dump in sequence, and providing an interceptor ditch and a retaining wall at a highest position and a lowest position of the lead-zinc slag dump respectively;

step 2, planting ground covers and/or shrubs in the planting soil layer;

step 3, providing baffle plates and a plurality of regulating assemblies in lead-zinc slag, wherein each of the regulating assemblies comprises a water tank, a blind ditch and a first isolation plate, the water tank is semi-circular, the blind ditch is located in the water tank, a bottom of the water tank is uniformly provided with deflector holes, a sliding groove is provided in a wall of the water tank, wherein an extension direction of the sliding groove is consistent with a length direction of the water tank, the sliding groove is communicated with the deflector holes, the first isolation plate is slidably connected in the sliding groove, the first isolation plate is provided with first water through holes corresponding to the deflector holes, a water outlet end of the water tank and a water outlet end of the blind ditch are connected with a reservoir, and ends of a plurality of water tanks and corresponding blind ditches far away from the reservoir are fixedly connected through the baffle plates; providing water spraying components in the planting soil layer, wherein each of the water spraying components comprises a water supply pipe, a second isolation plate and a plurality of sprinklers, the plurality of sprinklers are installed in a top of the water supply pipe and are communicated with the water supply pipe, the sprinklers extend to the planting soil layer outside, a bottom of the water supply pipe is uniformly provided with diversion holes, the second isolation plate is slidably connected to an inner bottom of the water supply pipe, the second isolation plate is provided with second water through holes corresponding to the diversion holes, the water supply pipe is connected with a pool, submersible pumps are provided in the pool, and each of the submersible pumps is communicated with the water supply pipe; each of the second water through holes is connected with a shunt pipe, and an end of the shunt pipe far away from corresponding one of the second water through holes is communicated with the blind ditch; the first isolation plate and the second isolation plate are both connected to power components that drive the first isolation plate and the second isolation plate to slide;

step 4, watering the ground covers and the shrubs through the pool, wherein the second isolation plate is driven to move through corresponding one of the power components, so that the diversion holes are staggered with the second water through holes on the second isolation plate, the submersible pumps are started, water in the pool is pumped into the water supply pipe by corresponding one of the submersible pumps, and then the ground covers and the shrubs are watered through the sprinklers; simultaneously putting a medicine or a liquid fertilizer into the pool, and then applying the medicine or spraying the liquid fertilizer to the ground covers and the shrubs; and step 5, providing nutrients for microorganisms in the lead-zinc slag through the pool, wherein the first isolation plate and the second isolation plate are driven to move simultaneously by the power components, so that the first water through holes are communicated with corresponding the deflector holes, the nutrients are injected into the pool, the nutrients in the pool are pumped into the water supply pipe by corresponding one of the submersible pumps, then enter the blind ditch through the shunt pipe, and finally enter the lead-zinc slag from the deflector holes of the water tank.

The embodiment has the following beneficial effects. The embodiment is provided with the blind ditches, the water tanks and the water supply pipes, and the blind ditches and the water tanks are used to provide air for the microorganisms in the lead-zinc slag, and thereby improve a survival rate of the microorganisms as well as be conducive to reduce toxic and side effects of heavy metals in the lead-zinc slag. In addition, the water tanks are used to provide the nutrients for the microorganisms in the lead-zinc slag, which is helpful to promote growth of the microorganisms and further improve the survival rate of the microorganisms in the lead-zinc slag. Moreover, rainwater enters the lead-zinc slag to form leachate, and the leachate flows into the reservoir through the blind ditches to be collected and treated, thus greatly reducing contents of the leachate entering the soil and groundwater.

In an embodiment, protective nets are provided in the lead-zinc slag, and each of the protective nets is fixedly connected with the water tanks. As the lead-zinc slag, the curing agent layer, the clay barrier layer and the planting soil layer are piled up on the soil surface in turn, and there is a lack of strong connection between each layer, it is easy to cause landslides in the case of a large amount of the rainwater in summer. After arranging the protective nets, each of the protective nets is fixedly connected to the water tanks, and the water tanks, the blind ditches and the protective nets enclose the lead-zinc slag dump into a whole, so as to avoid sliding in layers, prevent the lead-zinc slag from sliding down and prevent further downward migration of the heavy metals when the lead-zinc slag gathers at the protective nets.

In an embodiment, the plurality of regulating assemblies are provided on a same vertical surface of the lead-zinc slag. In upper and lower adjacent regulating assemblies, the blind ditch in the upper regulating assemblies and the water tank in the lower regulating assemblies are communicated to each other by the guide pipe. When the lead-zinc slag dump is high, the regulating assemblies may provide evenly distributed air and nutrients for the growth of the microorganisms.

In an embodiment, an end of the guide pipe is threadedly connected in corresponding one of the deflector holes, an other end of the guide pipe is communicated with the blind ditch adjacently located below the regulating assemblies, wherein a number of guide pipes is a half number of the deflector holes on the water tank, and the guide pipes are arranged at intervals, so that the guide pipes are evenly distributed in the lead-zinc slag, which is beneficial to evenly providing the air and the nutrients for the microorganisms in the lead-zinc slag.

In an embodiment, the planting soil layer is sprayed with vegetation-growing concrete, which is conducive to further improve slope protection strength and erosion resistance of the surface of the lead-zinc slag dump.

In an embodiment, the lead-zinc slag is supplemented with functional bacteria resistant to lead-zinc every 3-5 months; during replenishment, the functional bacteria resistant to lead-zinc are put into the pool, pumped into the water supply pipes by corresponding one of the submersible pumps, and then enter the lead-zinc slag through the shunt pipes, the blind ditches and the water tanks, which may accelerate digestion of lead and zinc in the lead-zinc slag.

In an embodiment, the ground covers are selected from at least one of *Trifolium* and *Cynodon dactylon*.

In an embodiment, the shrubs are at least one of *Pinus armandii, Cryptorneria japonica, Robinia pseudoacacia, Broussonetia papyrifera, Prunus* subg. *Cerasus, Osrnanthus fragrans* and *Morus alba*.

DETAILED DESCRIPTION

Figure 1:
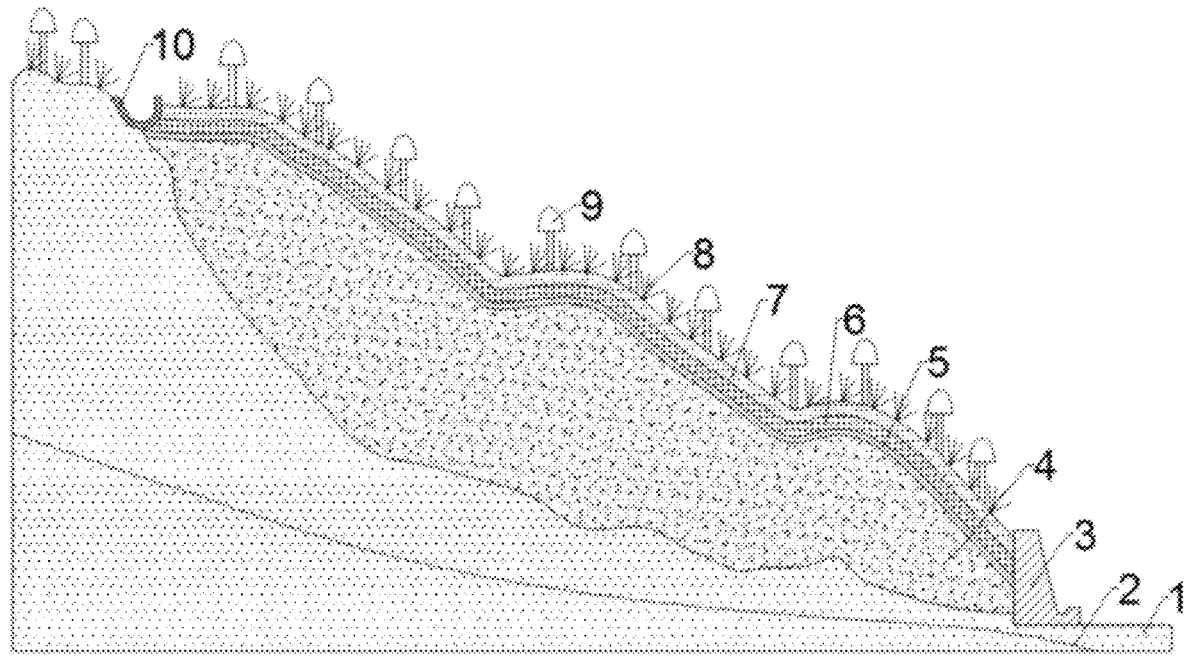
FIG. 1 is a schematic sectional view of in-situ remediation of a lead-zinc slag dump in the prior art.
Figure 2:
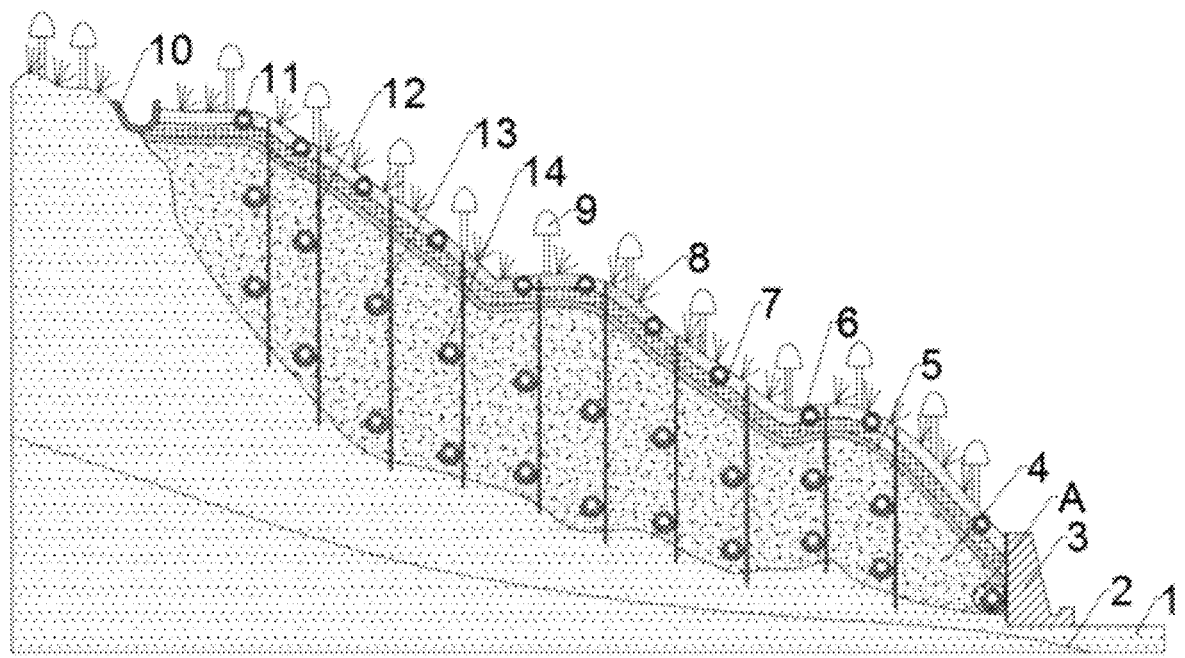
FIG. 2 is a schematic sectional view of in-situ remediation of a lead-zinc slag dump of the present application.
Figure 3:
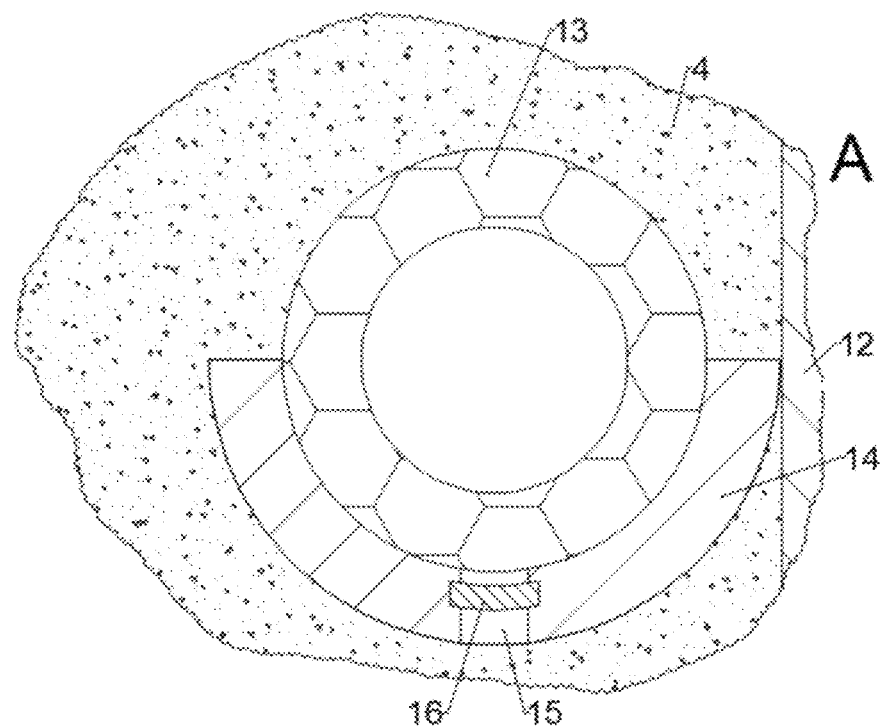
FIG. 3 is an enlarged view at A in FIG. 2.
Figure 4:
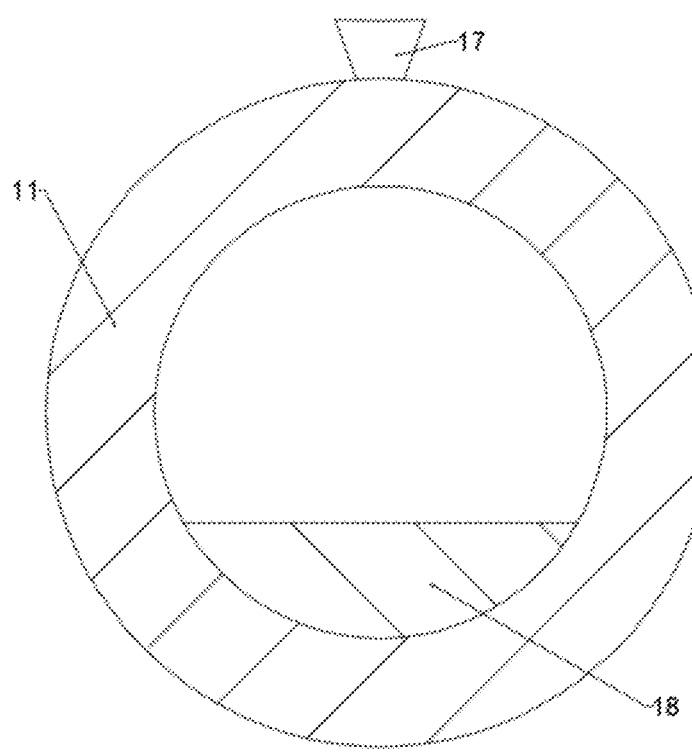
FIG. 4 is a cross-sectional view of a water supply pipe connecting a sprinkler and a second isolation plate.
Figure 5:
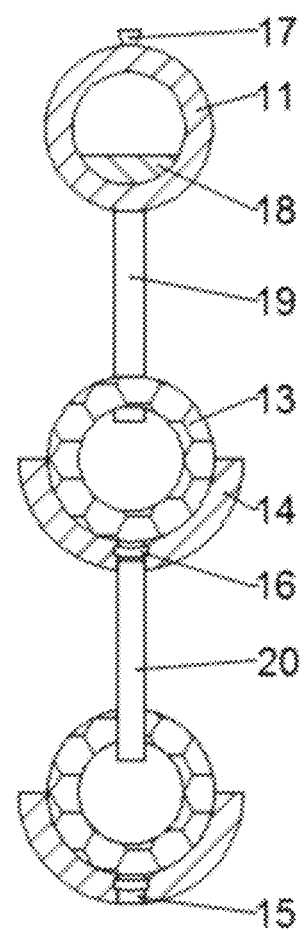
FIG. 5 is a schematic connection diagram of a water spraying component and regulating assemblies in FIG. 2.

The present application is further explained in detail through specific embodiments.

Embodiment 1

As shown in FIG. 2, FIG. 3, FIG. 4, FIG. 5 and FIG. 11, an in-situ remediation method for a lead-zinc slag 4 dump includes:

step 1: a curing agent layer 5, a clay barrier layer 6 and a planting soil layer 7 are provided on a surface of the lead-zinc slag 4 dump in sequence, and an interceptor ditch 10 and a retaining wall 3 are provided at a highest position and a lowest position of the lead-zinc slag 4 dump respectively, where quick lime is used as the curing agent, an amount of the quick lime is 30-32 kilograms per square meter (kg/m 2), a thickness of the clay barrier layer 6 is 15-17 centimeter (cm) and a thickness of the planting soil layer 7 is 20-25 cm;

step 2: ground covers 8 and shrubs 9 are planted in the planting soil layer 7, where *Cynodon dactylon* and *Trifolium* are used as the ground covers 8, a total seeding amount of the *Cynodon dactylon* and the *Trifolium* is 30-32 grams per square meter (g/m$^2$), *Broussonetia papyrifera*, *Cryptomeria japonica* and *Robinia pseudoacacia* are used as the shrubs 9, and a total planting amount of the *Broussonetia papyrifera*, the *Cryptomeria japonica* and the *Robinia pseudoacacia* is 250-280 plants/mu (1 mu≈666.7 m$^2$);

step 3: baffle plates and twenty-one regulating assemblies are provided in the lead-zinc slag 4, where each of the regulating assemblies includes a water tank 14, a blind ditch 13 and a first isolation plate 16, in which the water tank 14 is semi-circular, the blind ditch 13 is located in the water tank 14, a bottom of the water tank 14 is uniformly provided with deflector holes 15, in which distances between the adjacent deflector holes 15 are 1-1.5 meters (m), a sliding groove is provided in a wall of the water tank 14, in which an extension direction of the sliding groove is consistent with a length direction of the water tank 14, the sliding groove is communicated with the deflector hole 15, in which a width of the sliding groove is greater than bore diameters of the deflector holes 15, the first isolation plate 16 is slidably connected in the sliding groove and is provided with first water through holes corresponding to the deflector holes 15, a water outlet end of the water tank 14 and a water outlet end of the blind ditch 13 are connected with a reservoir, ends of a plurality of water tanks 14 and ends of a plurality of blind ditches 13 far away from the reservoir are fixedly connected through the baffle plates, and the baffle plates block the ends of the water tanks 14 and the ends of the blind ditches 13 far away from the reservoir; eleven water spraying components are provided in the planting soil layer 7, where each of the water spraying components includes a water supply pipe 11, a second isolation plate 18 and a plurality of sprinklers 17, the plurality of sprinklers 17 are installed in a top of the water supply pipe 11, are communicated with the water supply pipe 11 and extend to the planting soil layer 7 outside, a bottom of the water supply pipe 11 is uniformly provided with diversion holes, and the second isolation plate 18 is connected to an inner bottom of the water supply pipe 11 in a sliding way and is provided with second water through holes corresponding to the diversion holes; the water supply pipe 11 is connected with a pool, submersible pumps are provided in the pool, a water outlet end of each of the submersible pumps is connected with a water delivery pipe, and the water delivery pipe is communicated with the water supply pipe 11, where a number of the submersible pumps is adjusted according to a number and diameters of the water supply pipes 11; each of the second water through holes is connected with a shunt pipe 19, and an end of the shunt pipe 19 far from corresponding one of the second water through holes is communicated with the blind ditch 13; in upper and lower adjacent regulating assemblies, the blind ditch 13 in the upper regulating assemblies and the water tank 14 in the lower regulating assemblies are communicated to each other by the guide pipe 20, specifically: an end of the guide pipe 20 is threadedly connected in corresponding one of the deflector holes 15 in the upper regulating assemblies, and an other end of the guide pipe 20 is communicated with the adjacent blind ditch 13 in the lower regulating assemblies, where a number of guide pipes 20 is a half number of the deflector holes 15 on the water tank 14, and the guide pipes 20 are arranged at intervals;

the first isolation plate 16 and the second isolation plate 18 are both connected to power components that drive the first isolation plate 16 and the second isolation plate 18 to slide, each of the power component includes an electric motor and a power transmission mechanism, in which the power transmission mechanism are a gear, a bottom of the first isolation plate 16 and a bottom of the second isolation plate 18 are provided with a meshing gear respectively that mesh with the gear; the submersible pumps and the motor are connected to a plc controller by electrical signals, where the plc controller is Siemens S7-400 plc controller; eleven protective nets 12 are provided in the lead-zinc slag 4, and the protective nets 12 are fixedly connected with the water tanks 14;

step 4: the ground covers 8 and the shrubs 9 are watered through the pool, specifically: the second isolation plate 18 is driven to move through corresponding one of the power components, so that the diversion holes are staggered with the second water through holes on the second isolation plate 18, the submersible pumps are started through the plc controller, water in the pool is pumped to the water supply pipe 11 by the submersible pumps, and then the ground covers 8 and the shrubs 9 are watered via the sprinklers 17; depending on actual needs, a medicine or a liquid fertilizer is put into the pool and then applied to the ground covers 8 and the shrubs 9; and step 5: nutrients are provided for the microorganisms in the lead-zinc slag 4 through the pool, specifically: the plc controller controls the motor (including steering, rotating speed and working time) to work, the first isolation plate 16 and the second isolation plate 18 are simultaneously driven to move by the power components, so that the first water through holes are communicated with corresponding the deflector holes 15, the nutrients are injected into the pool and pumped to the water supply pipes 11 by the submersible pumps, so that the nutrients enter the blind ditches 13 through the shunt pipes 19, and finally enter the lead-zinc slag 4 through the deflector holes 15 of the water tanks 14;

biogas slurry is used as the nutrients and sprayed once a month; the shrubs 9 and the ground covers 8 are watered and sprayed with the medicine according to actual conditions; the lead-zinc slag 4 is supplemented with functional bacteria resistant to lead-zinc every 3-5 months, where *Verticillium insectivum* is used as the functional bacteria resistant to lead-zinc, specifically: the functional bacteria resistant to lead-zinc are put into the pool, pumped into the water supply pipes 11 by corresponding one of the submersible pumps, then flow through the shunt pipes 19, the blind ditches 13 and the water tanks 14 to the lead-zinc slag 4.

The difference between embodiment 2 and embodiment 1 is that the planting soil layer 7 is sprayed with vegetation-growing concrete with a thickness of 5-6 cm.

Figure 6:
FIG. 6 is a drawing for remediating a lead-zinc slag dump by using the in-situ remediation method in the application.
Figure 7:
FIG. 7 is a drawing for remediating a lead-zinc slag dump by using the in-situ remediation method in the application.
Figure 8:
FIG. 8 is a drawing for remediating a lead-zinc slag dump by using the in-situ remediation method in the application.

Implementation Verification:

In August, 2012, the applicant carried out in-situ remediation of a lead-zinc slag in Qunfa Village, Houchang Town, Weining County according to the in-situ remediation method in embodiment 1. As shown in FIG. 6, a volume of slag obtained by indigenous zinc smelting at this site is 480 cubic meters (m$^3$) and the slag covers an area of about 7000 (m$^2$). In a process of the in-situ remediation, the difference from embodiment 1 is that downward extending drainage ditches were provided in the middle of the lead-zinc slag dump mainly based on the safety concerns of the people's houses above, and the place was photographed and compared in March 2018, as shown in FIG. 7-FIG. 8. By measuring contents of heavy metals in the pool, it may be found that the contents of the heavy metals decrease by about 20% every year compared with the previous year, and the *Trifolium* and the *Cynodon dactylon* on the dump have been gradually succeeded by macrophanerophytes.

Figure 9:
FIG. 9 is drawing for remediating a lead-zinc slag dump by a conventional in-situ remediation method.
Figure 10:
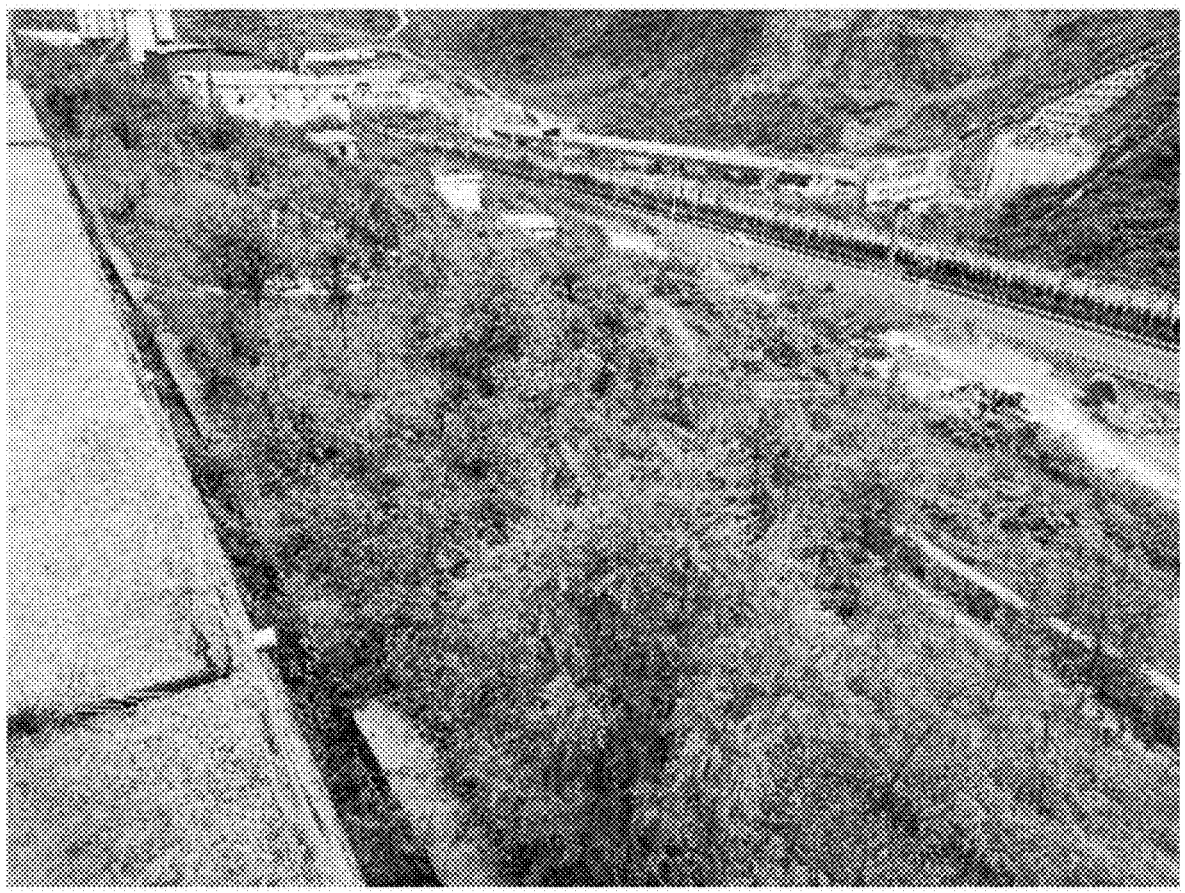
FIG. 10 is a drawing for remediating a lead-zinc slag dump by a conventional in-situ remediation method.
Figure 11:
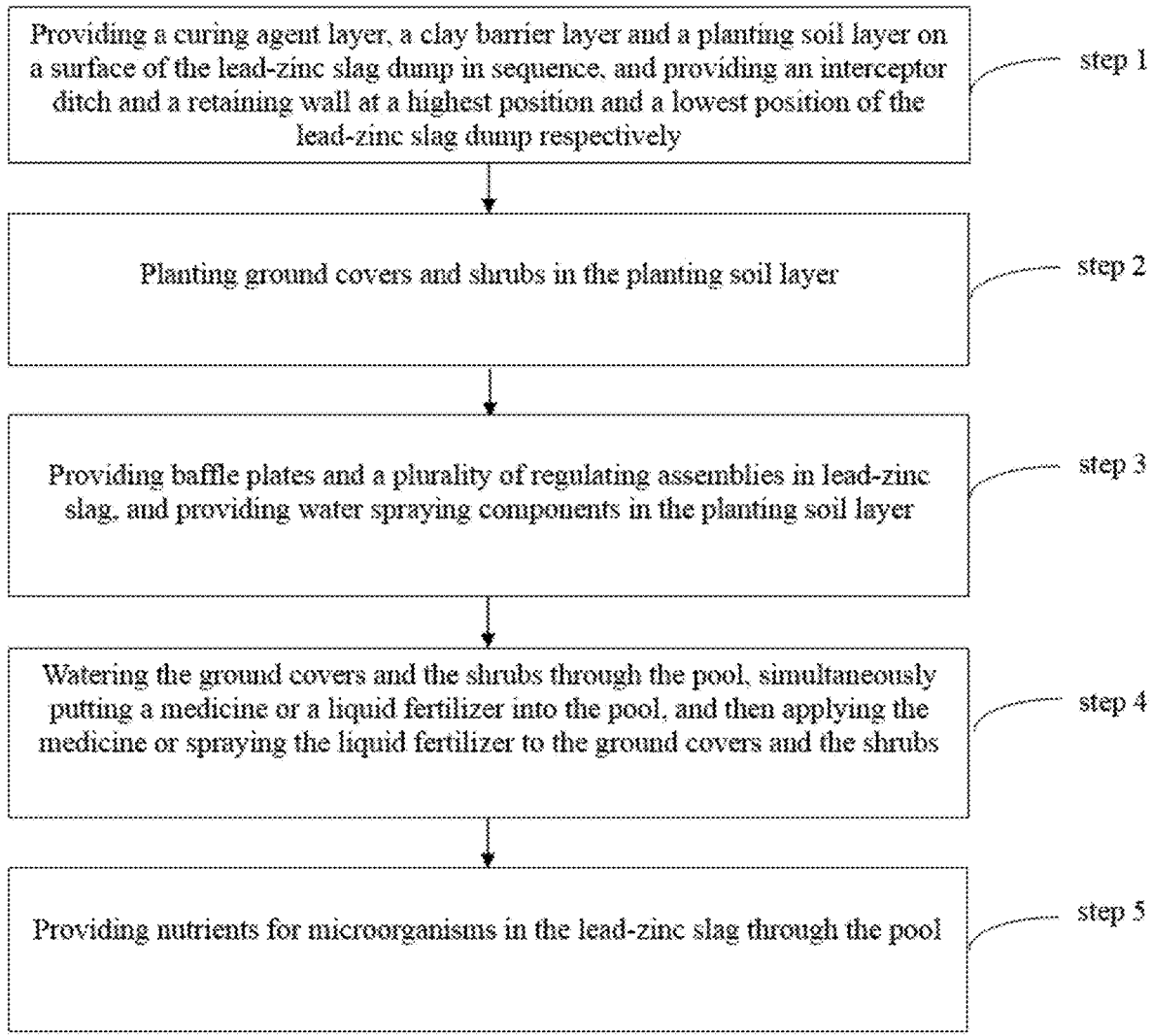
FIG. 11 is a flow chart of an in-situ remediation method for a lead-zinc slag dump in the application.

In addition, in May, 2012, the applicant used the prior art (different from that in embodiment 1, the prior art was not provided with the regulating assemblies, the baffle plates and other related equipment, but only provided with the water supply pipes 11 and the sprinklers 17; the shrubs 9 were mainly *Cryptomeria japonica*) to carry out in-situ remediation of a lead-zinc slag dump in Douqing Town, Shuicheng County, and situations of the dump were shown in FIG. 9. FIG. 10 shows a photo of the dump taken in May 2018.

By comparing the drawings, it may be seen that the in-situ remediation method in the application may achieve better results.

The technical schemes of the present application are clearly and completely described with reference to the drawings, and it is clear that the described embodiments are a part of the embodiments of the present application, and not all of them. Based on the embodiments in the present application, all other embodiments obtained by a person of ordinary skill in the art without making creative labor fall within the scope of protection of the present application. It should be understood that the technical schemes of the present application are not limited to the limits of the above specific embodiments, and any technical variations made according to the technical solutions of the present application, without departing from the scope protected by the objective and claims of the present application, fall within the scope of protection of the present application.

What is claimed is:

1. An in-situ remediation method for a lead-zinc slag dump, comprising following steps:
    step 1, providing a curing agent layer, a clay barrier layer and a planting soil layer on a surface of the lead-zinc slag dump in sequence, and providing an interceptor ditch and a retaining wall at a highest position and a lowest position of the lead-zinc slag dump respectively;
    step 2, planting ground covers and shrubs in the planting soil layer;
    step 3, providing baffle plates and a plurality of groups of regulating assemblies in lead-zinc slag, wherein each of the plurality of regulating assemblies comprises a water tank, a blind ditch and a first isolation plate, the water tank is semi-circular, the blind ditch is located in the water tank, a bottom of the water tank is uniformly provided with deflector holes, a sliding groove is provided in a wall of the water tank, wherein an extension direction of the sliding groove is consistent with a length direction of the water tank, the sliding groove is communicated with the deflector holes, the first isolation plate is slidably connected in the sliding groove, the first isolation plate is provided with first water through holes corresponding to the deflector holes, water outlet ends of the water tank and the blind ditch are connected with a reservoir, and ends of the plurality of water tanks and blind ditches of the regulating assemblies away from the reservoir are fixedly connected through the baffle plates; providing water spraying components in the planting soil layer, wherein each of the water spraying components comprises a water supply pipe, a second isolation plate and a plurality of sprinklers, the plurality of sprinklers are installed in a top of the water supply pipe and are communicated with the water supply pipe, the sprinklers extend to the planting soil layer outside, a bottom of the water supply pipe is uniformly provided with diversion holes, the second isolation plate is slidably connected to an inner bottom of the water supply pipe, the second isolation plate is provided with second water through holes corresponding to the diversion holes, the water supply pipe is connected with a pool, submersible pumps are provided in the pool, and each of the submersible pumps is communicated with the water supply pipe; each of the second water through holes is connected with a shunt pipe, and an end of the shunt pipe away from the second water through holes is communicated with the blind ditch; the first isolation plate and the second isolation plate are both connected to power components driving them to slide;
    step 4, watering the ground covers and the shrubs through the pool, wherein the second isolation plate is driven to move through the power components, so that diversion holes on the second isolation plate are staggered with the second water through holes, the submersible pumps are started, water in the pool is pumped into the water supply pipe by the submersible pumps, and then the ground covers and the shrubs are watered through the sprinklers; at a same time, by applying a medicine or a liquid fertilizer to the pool, applying the medicine or spraying the liquid fertilizer to the ground covers and the shrubs; and
    step 5, providing nutrients for microorganisms in the lead-zinc slag through the pool, wherein the first isolation plate and the second isolation plate are driven to move simultaneously by the power components, so that the first water through holes are communicated with the deflector holes, the nutrients are injected into the pool, the nutrients in the pool are pumped into the water supply pipe by the submersible pumps, then enter the blind ditch through the shunt pipe, and finally enter the lead-zinc slag from the deflector holes of the water tank.

2. The in-situ remediation method for the lead-zinc slag dump according to claim 1, wherein protective nets are provided in the lead-zinc slag, and each of the protective nets is fixedly connected with the water tanks.

3. The in-situ remediation method for the lead-zinc slag dump according to claim 2, wherein each of the plurality of groups of regulating assemblies include an upper regulating assembly adjacent a lower regulating assembly provided on a same vertical surface, and the blind ditch and the water tank on the upper and lower adjacent regulating assemblies are communicated through a guide pipe.

4. The in-situ remediation method for the lead-zinc slag dump according to claim 3, wherein an end of the guide pipe is threadedly connected in the deflector holes, another end of the guide pipe is communicated with the blind ditch adjacently located below, wherein a number of guide pipes is a half number of the deflector holes on the same water tank, and the guide pipes are arranged at intervals.

5. The in-situ remediation method for the lead-zinc slag dump according to claim 4, wherein the planting soil layer is sprayed with vegetation-growing concrete.

6. The in-situ remediation method for the lead-zinc slag dump according to claim wherein the lead-zinc slag is supplemented with functional bacteria resistant to lead-zinc every 3-5 months; during replenishment, the functional bacteria resistant to the lead-zinc are put into the pool, pumped into the water supply pipe by the submersible pumps, and then enter the lead-zinc slag through the shunt pipe, the blind ditch and the water tank.

7. The in-situ remediation method for the lead-zinc slag dump according to claim 6, wherein the ground covers are selected from at least one of *Trifolium* and *Cynodon dactylon*.

8. The in-situ remediation method for the lead-zinc slag dump according to claim 7, wherein the shrubs are at least one of *Pinus armandii, Cryptomeria japonica, Robinia pseudoacacia, Broussonetia papyrifera, Prunus* subg. *Cerasus*, Osmanthus *fragrans* and *Morus alba*.

\* \* \* \* \*